US012614993B2

(12) United States Patent
Nagura et al.

(10) Patent No.: US 12,614,993 B2
(45) Date of Patent: Apr. 28, 2026

(54) LOAD DRIVER

(71) Applicant: DENSO CORPORATION, Kariya-city (JP)

(72) Inventors: Koki Nagura, Kariya-city (JP); Hideki Kabune, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 205 days.

(21) Appl. No.: 18/651,298

(22) Filed: Apr. 30, 2024

(65) Prior Publication Data

US 2024/0283374 A1      Aug. 22, 2024

Related U.S. Application Data

(63) Continuation of application No. PCT/JP2022/038976, filed on Oct. 19, 2022.

(30) Foreign Application Priority Data

Nov. 2, 2021      (JP) ................................. 2021-179708

(51) Int. Cl.
 *H02M 7/538*          (2007.01)
 *H02M 1/08*           (2006.01)
 *H02M 1/12*           (2006.01)
 *H02M 7/5387*         (2007.01)

(52) U.S. Cl.
 CPC ........... *H02M 7/5387* (2013.01); *H02M 1/08* (2013.01); *H02M 1/126* (2013.01)

(58) Field of Classification Search
 CPC ....... H02M 7/5387; H02M 1/08; H02M 1/126
 See application file for complete search history.

(56) References Cited

U.S. PATENT DOCUMENTS

2013/0207576 A1*   8/2013  Fukuoka ................. E05F 15/40
                                                          318/283
2014/0055059 A1    2/2014  Uryu et al.
                              (Continued)

FOREIGN PATENT DOCUMENTS

WO        2023204081 A1    10/2023

OTHER PUBLICATIONS

U.S. Appl. No. 18/651,235 and its entire file history, filed 2024.

*Primary Examiner* — Rafael O De Leon Domenech
(74) *Attorney, Agent, or Firm* — Precision Patents, P.C.

(57)          ABSTRACT

A power converter is connected between a power supply line and a ground line, and the power supply line is connected to a battery. The power converter supplies converted power to a load by converting direct current power of the battery. A control circuit controls the power converter by a voltage applied from the battery. A reverse-connection protective relay is connected to the ground line, and interrupts a current flowing from the ground line to the power supply line via the power converter in a case where the battery is connected in a reverse direction. A voltage required for turning on the reverse-connection protective relay is applied to a gate of the reverse-connection protective relay in a case where the battery is connected in a forward direction, and is not applied to the gate of the reverse-connection protective relay in a case where the battery is connected in the reverse direction.

6 Claims, 10 Drawing Sheets

(56)                    References Cited

U.S. PATENT DOCUMENTS

| | | | |
|---|---|---|---|
| 2016/0036288 A1* | 2/2016 | Yamasaki | .............. H02K 5/225 |
| | | | 310/52 |
| 2016/0036305 A1* | 2/2016 | Kawata | ................ B62D 5/0463 |
| | | | 180/443 |
| 2016/0181885 A1* | 6/2016 | Yamasaki | .............. H02K 5/225 |
| | | | 180/443 |
| 2017/0294860 A1* | 10/2017 | Yamasaki | ............... H02P 25/22 |
| 2019/0126972 A1 | 5/2019 | Okamura et al. | |
| 2019/0144029 A1* | 5/2019 | Taki | ........................ H02P 27/06 |
| | | | 318/3 |
| 2020/0377143 A1* | 12/2020 | Miyachi | ............... H02P 29/032 |

* cited by examiner

AVALANCHE BREAKDOWN

REVERSE CONNECTION PROTECTIVE RELAY

VOLTAGE BETWEEN DRAIN AND SOURCE Vds

BVdss

Tas

CURRENT Id

Ias

VOLTAGE BETWEEN GATE AND SOURCE Vgs

ON THRESHOLD VALUE ts          te          TIME

AVALANCHE ENERGY $$Eas = \frac{1}{2} \times BVdss \times Ias \times Tas$$

LOAD DRIVER

CROSS REFERENCE TO RELATED APPLICATIONS

The present application is a continuation application of International Patent Application No. PCT/JP2022/038976 filed on Oct. 19, 2022, which designated the U.S. and claims the benefit of priority from Japanese Patent Application No. 2021-179708 filed on Nov. 2, 2021. The entire disclosures of all of the above applications are incorporated herein by reference.

TECHNICAL FIELD

The present disclosure relates to a load driver.

BACKGROUND

A load driver may convert direct-current (DC) power of a battery through a power converter such as an inverter and supply the converted power to a load such as a three-phase motor. For example, an electric motor driver may have a reverse connection protective relay at a power supply line. The reverse connection protective relay may prevent a current from flowing through a circuit when a battery is in a reverse connection. Motor relays and the reverse connection protective relay may be driven by a common driver circuit.

SUMMARY

The present disclosure describes a load driver having a power converter, a controller, and a reverse connection protective relay.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
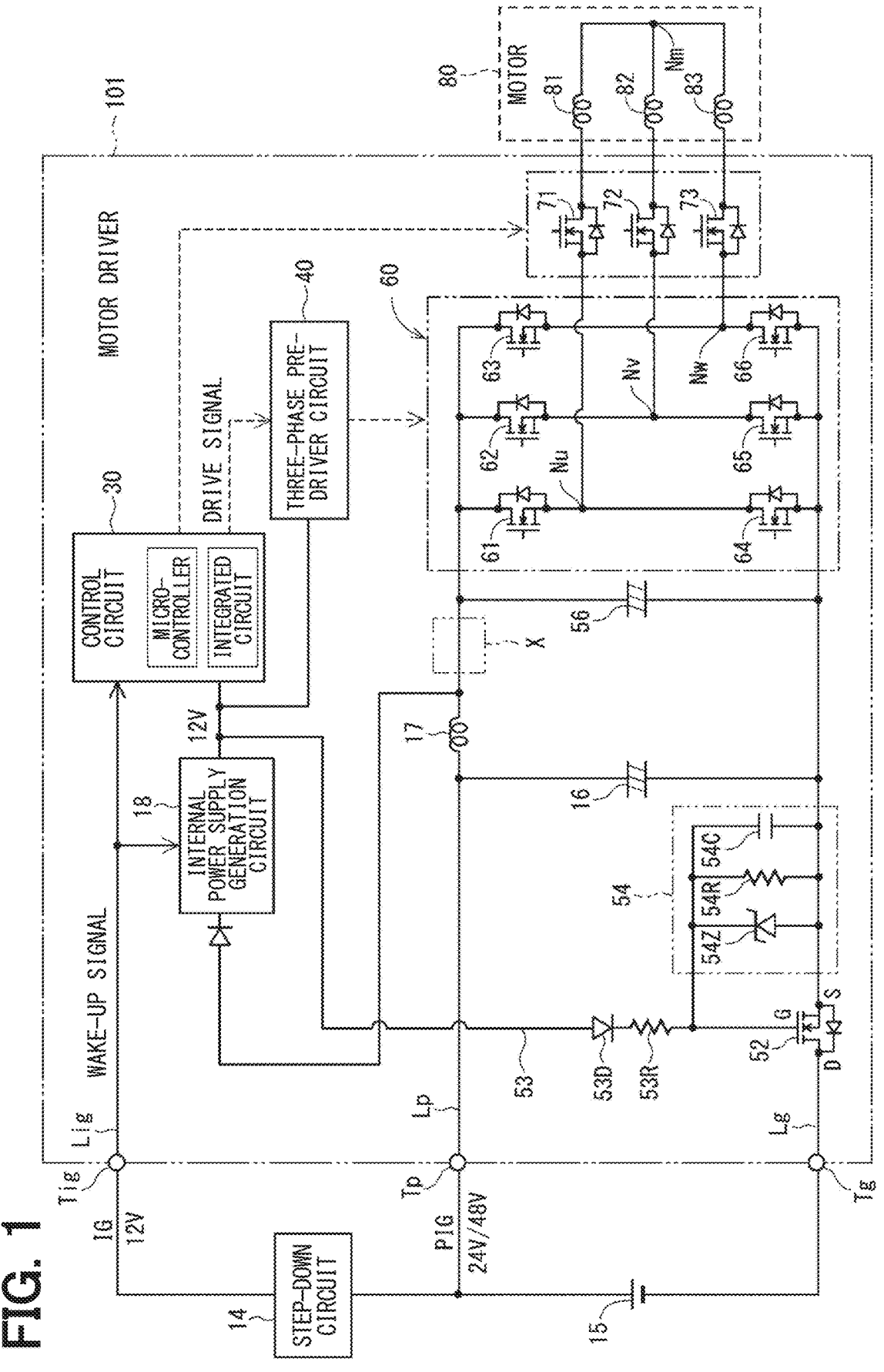
FIG. 1 is a configuration diagram of a motor driver in GB arrangement according to a first embodiment.

A load driver such as an auxiliary motor adapted to a vehicle may be designed with a 12-volt battery. However, the auxiliary battery voltage for an electric vehicle may be expected to be increased to 24 volts or 48 volts, which exceeds the voltage tolerance of a conventional 12-volt drive circuit. Therefore, in addition to an inverter capable of operating at a high voltage, a driver circuit may be required to drive the reverse connection protective relay, which poses challenges in terms of downsizing and high integration of a motor driver.

A load driver according to the present disclosure includes a power converter, a control circuit, and a reverse connection protective relay. The power converter is provided between a ground line and a power supply line connected to a battery. The power converter supplies converted power to a load by converting direct current power of the battery. The control circuit is operated by a voltage applied from the battery to control an operation of the power converter.

The reverse connection protective relay is a semiconductor switching element. In the off state of the reverse connection protective relay, the reverse connection protective relay interrupts a current flowing from the ground line to the power supply line via the power converter when the battery is connected in a reverse direction.

According to a first aspect of the present disclosure, the reverse connection protective relay is provided at the ground line. The voltage for turning on the reverse connection protective relay is applied to a gate of the reverse connection protective relay when the battery is connected in a forward direction, but is not applied to the gate when the battery is connected in a reverse direction.

For example, when the reverse connection protective relay being an N-channel MOSFET is connected to the power supply line, a high voltage driver capable of applying a voltage obtained by adding the gate drive voltage to the battery voltage to the gate is required. Thus, it might be difficult for miniaturization. In contrast, according to the first aspect of the present disclosure, since the reverse connection protective relay is connected to the ground line, it is possible to execute gate drive at a low voltage. Therefore, a high voltage driver is not required. Therefore, the reverse connection protective relay can be driven with a simple configuration.

When the battery is connected in a reverse direction, the voltage for turning on the reverse connection protective relay is not applied to the gate, so the reverse connection protective relay is turned off. Therefore, by arranging the reverse connection protective relay on the battery side, it is possible to protect, for example, a polar capacitor used in an LC filter circuit against a negative bias voltage.

A load driver according to a second aspect of the present disclosure includes a power converter, a control circuit, a reverse connection protective relay and a multiphase pre-driver circuit. The power converter includes pairs of an upper-arm switching element and a lower-arm switching elements that are provided for respective phases of a motor. The upper-arm switching element and the lower-arm switching element are connected in series between a power supply line and a ground line. The power supply line is connected to a battery. The control circuit and reverse connection protective relay are the same as in the first embodiment.

The multiphase pre-driver circuit is operated by a voltage applied from the battery in order to drive the pairs of the switching elements in the power converter. The multiphase pre-driver circuit includes a charge pump that boosts the battery voltage. The output end of the charge pump is connected to the gate of the reverse connection protective relay. During an operation of the charge pump, the reverse connection protective relay is turned on by the output voltage of the charge pump.

As a result, according to the second aspect, a driver circuit dedicated to the reverse connection protective relay is not required. Therefore, the reverse connection protective relay can be driven with a simple configuration. For example, when the battery voltage is increased from 12 volts to 24 volts or 48 volts, the charge pump voltage for driving the inverter is increased, and the reverse connection protective relay can also be driven.

The following describes load motor drivers according to multiple embodiments with reference to the drawings. In the multiple embodiments, substantially the same components are denoted by the same reference numerals, and a description of the same components will be omitted. The following first to fifth embodiments are collectively referred to as "present embodiment". A load driver according to the present embodiment is a motor driver. The motor driver converts direct-current (DC) power of a battery and then supplies the converted power to a steering assistive motor as a load. The steering assistive motor is a three-phase brushless motor.

The voltage of the auxiliary battery installed in vehicles has traditionally been 12 volts, but in this embodiment, it is mainly assumed to be 24 volts or 48 volts, which are expected to be adopted in future electric vehicles. "24V/48V" in the drawings and the following description means "24 volts or 48 volts." However, even when using a 12-volt battery, the configuration according to the present embodiment is basically the same. As it is obvious from the use of the term "IG (ignition)," the present embodiment may be applied not only to electric vehicles but also to engine vehicles.

Specifically, the ECU of the electric power steering apparatus functions as a motor driver. The ECU includes, for example, a microcomputer, a customized integrated circuit, and the like, and has a CPU (not shown), a ROM, a RAM, an I/O, and a bus line connecting these components. The ECU performs required control by executing software processing or hardware processing. The software processing may be implemented by causing the CPU to execute a program. The program may be stored beforehand in a memory device such as a ROM, that is, in a readable non-transitory tangible storage medium. The hardware processing may be implemented by a special purpose electronic circuit.

In each of the following embodiments, a motor driver capable of driving the reverse connection protective relay with a simple configuration. Based on the technical concept, the present disclosure can be broadly divided into a group of first to fourth embodiments and a fifth embodiment. First, the configuration according to the first embodiment is described in detail. Since the second to fourth embodiments differ from the first embodiment only in some parts, the differences from the first embodiment are briefly described. Subsequently, the configuration according to the fifth embodiment is described.

Further, in the first to fourth embodiments, depending on the installation location of the reverse connection protective relay, the configuration may be in "GB arrangement" or "GA arrangement", which are described hereinafter. The essential advantageous effects are the same for the GB arrangement and the GA arrangement, but the GB arrangement further exhibits a functional effect of "protecting a polar filter capacitor." Therefore, the configuration diagrams according to the first to fourth embodiments essentially illustrate the GB arrangement, and a configuration diagram of the GA arrangement is added only in the first embodiment as a representative.

First Embodiment

FIG. 1 illustrates the configuration of a motor driver 101 in GB arrangement according to the first embodiment. In the following, a battery 15 being connected in a normal direction may also be referred to as a forward connection; and the battery 15 being connected in a direction being opposite to the normal direction may also be referred to as a reverse connection. In the forward connection state, the positive electrode of the battery 15 is connected to the power terminal Tp of the motor driver 101; and the negative electrode of the battery 15 is connected to the ground terminal Tg of the motor driver 101. The positive electrode of the battery 15 is connected to the IG terminal Tig of the motor driver 101 via a voltage step-down circuit 14.

Wirings connected to the power supply terminal Tp, ground terminal Tg, and IG terminal Tig are respectively referred to as a power supply line Lp, a ground line Lg, and an IG line Lig. The voltage applied to the power supply line Lp is referred to as a PIG voltage, and the voltage applied to the IG line Lig is referred to as an IG voltage. In the present embodiment, the PIG voltage is 24V or 48V, and the IG voltage is 12V. A wake-up signal is transmitted via the IG line Lig.

The motor driver 101 includes an inverter 60, a reverse connection protective relay 52, an internal power generation circuit 18, and a control circuit 30. The inverter 60 may also be referred to as a power converter. Although FIG. 1 illustrates the configuration of the motor driver 101 with a single system, a redundant configuration of two or more systems may be used. For example, in a motor driver with a dual system, the power is d from two inverters to a double-winding motor having two sets of windings.

The inverter 60 is provided between a power supply line Lp and a ground line Lg. The power supply line Lp is connected to a positive electrode of a battery 15 in the forward connection state. The ground line Lg is connected to a negative electrode of the battery 15 in the forward connection state. The inverter 60 includes three phases of upper and lower arm switching elements 61 to 66, which are connected in series between the power supply line Lp and the ground line Lg. The upper arm switching elements 61, 62, and 63 of the U phase, V phase, and W phase and the lower arm switching elements 64, 65, and 66 of the U phase, V phase, and W phase are connected in a bridge configuration. In the present embodiment, MOSFETs are used as the switching elements 61 to 66 of the inverters 60. In the present embodiment, the MOSFET is an n-channel type.

An inverter capacitor 56 is connected in parallel with inverter 60 between the power supply line Lp and the ground line Lg. The inverter capacitor 56 is an electrolytic capacitor, and is charged with energy supplied to the inverter 60 from the power supply line Lp. During a normal operation of the motor driver 101, the inverter capacitor 56 functions as a smoothing capacitor.

A filter capacitor 16 and a choke coil (inductor) 17 are provided on the battery 15 side of the inverter 60. The filter capacitor 16 and the choke coil 17 are included in an LC filter circuit adopted for a power supply filter. The choke coil 17 is provided on the power supply line Lp. The LC filter circuit is not limited to the L-type, which includes one filter capacitor 16 and one choke coil 17, as shown in the drawing, but may also be the TT-type or the T-type. The TT-type includes two filter capacitors 16. The T-type includes two choke coils 17. A common mode filter may be used as the power supply filter. When using a common mode choke coil, it is not necessary to consider protection of the polar capacitor of the LC filter circuit described below.

Typically, the filter capacitor 16 is a polar electrolytic capacitor such as an aluminum electrolytic capacitor, and forms an LC filter circuit with the choke coil 17. The aluminum electrolytic capacitors is smaller than non-polar capacitors such as film capacitors. However, while non-polarized capacitors have a negative bias tolerance equivalent to their positive bias tolerance, polarized capacitors have a lower negative bias tolerance compared to their positive bias tolerance. Therefore, if a negative bias voltage is applied when the battery 15 is in a reverse connection, the aluminum electrolytic capacitor may have a breakdown.

If the battery 15 is in the reverse connection, a current flows from the ground line Lg to the power line Lp via the inverter 60 unless the current path is interrupted. Even though the switching elements 60 to 66 of the inverter 60 are in the off state, the current flows via the parasitic diode. The reverse connection protective relay 52 is a semiconductor switching element, and interrupts the current when the reverse connection protective relay 52 is in the off state. The reverse connection protective relay 52 according to the present embodiment is a MOSFET, and the parasitic diode of the MOSFET conducts a current in a direction in which the current flows when the battery 15 is in the forward connection.

In a comparative example, the reverse connection protective relay is provided on the power supply line Lp. In contrast, in the motor driver 101 according to the first embodiment, the reverse connection protective relay 52 is provided on the ground line Lg. The MOSFET formed in the reverse connection protection relay 52 is connected such that its drain is on the ground terminal Tg side and its source is on the inverter 60 side.

In the present disclosure, the arrangement in which the reverse connection protective relay 52 provided on the ground line Lg is located between the filter capacitor 16 and the battery 15 is defined as GB arrangement. "GB" means the battery 15 side of the ground line Lg. In the GB arrangement, the reverse connection protective relay 52 is provided on the ground line Lg between the negative electrode of the filter capacitor 16 and the battery 15. In other words, the reverse connection protective relay 52 is connected to the ground line Lg between the negative electrode of the filter capacitor 16 and the battery. On the other hand, the arrangement in which the reverse connection protective relay 52 is provided between the filter capacitor 16 and the inverter 60 is defined as GA arrangement. "GA" means the motor 80 side of the ground line Lg, in other words, the actuator side of the ground line Lg.

A gate voltage is supplied to the gate of the reverse connection protective relay 52 via a gate voltage application path 53. In other words, a gate signal is sent to the gate of the reverse connection protective relay 52. The location from which the gate voltage is applied is distinct in each of the first to fourth embodiments. A diode 53D and a resistor 53R are connected in series to the gate voltage application path 53. The diode 53D prevents current from flowing backward from the gate of the reverse connection protective relay 52. The resistor 53R limits the current flowing to the gate.

Figure 4:
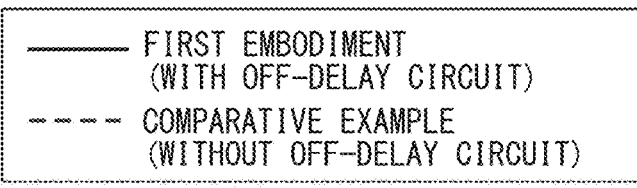
FIG. 4 is a time chart illustrating an operation of a relay OFF-delay circuit.
Figure 4:
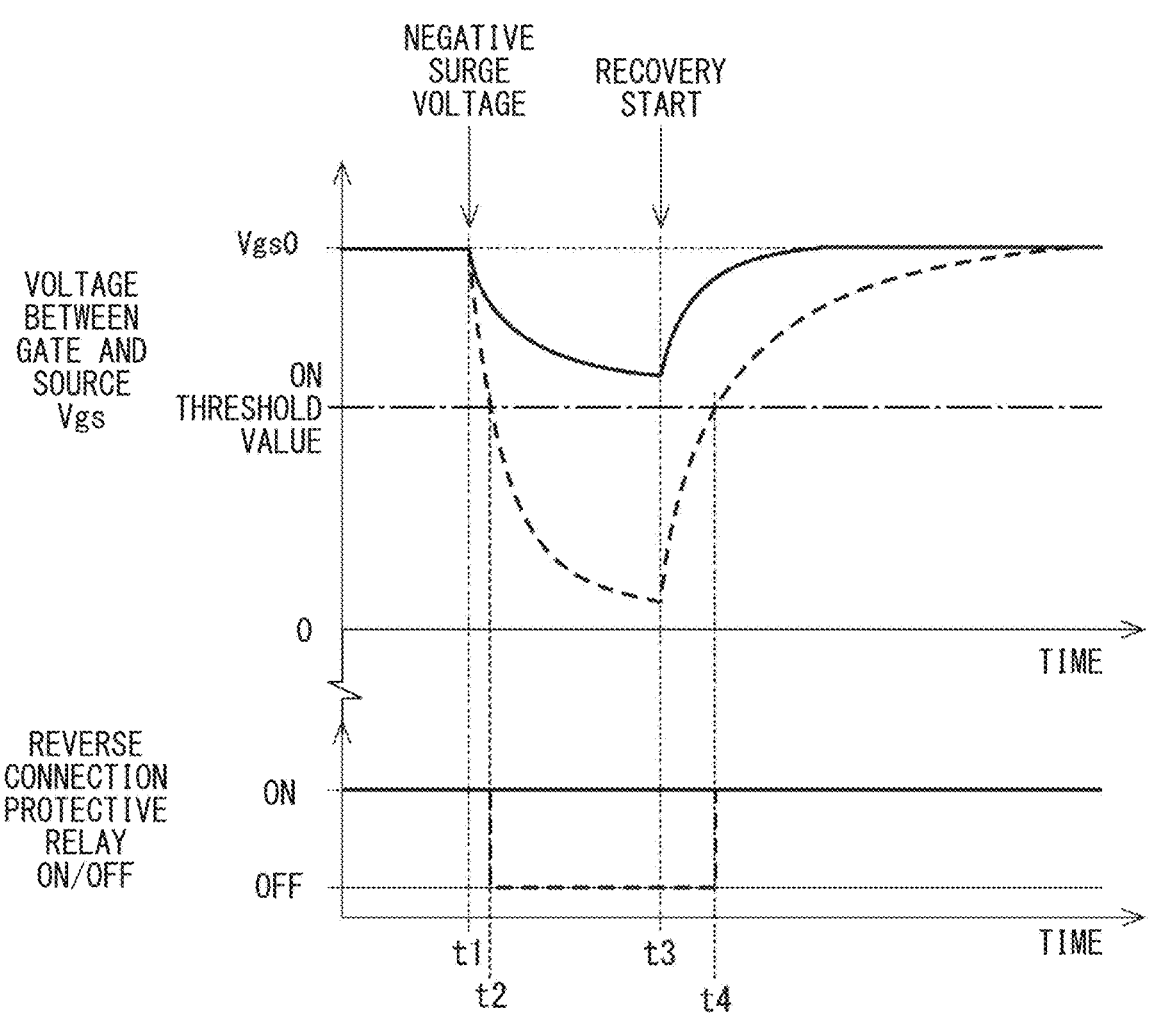

An OFF-delay circuit 54 is connected between the gate and source of the reverse connection protective relay 52. In the OFF-delay circuit 54, a Zener diode 54Z, a resistor 54R and a capacitor 54C are connected in parallel. When the voltage applied to the gate decreases, the OFF-delay circuit 54 delays the time until the reverse connection protective relay 52 is turned off by slowing down the rate of decrease in a voltage between the gate and source based on the time constant of RC elements. The operation of the OFF-delay circuit 54 is described hereinafter with reference to FIG. 4. As illustrated in FIG. 4, the OFF-delay circuit 54 delays the time of turning off the reverse connection protective relay 52.

The power supply relay may be located at the position X of the power supply line Lp indicated by a two-dotted chain line. In other words, the power supply relay may be provided between the choke coil 17 and the inverter 60. In this situation, the parasitic diode of the MOSFET included in the reverse-connection protective relay 52 conducts a current from the inverter 60 side to the battery 15 side. The power supply relay interrupts the current flowing from the battery 15 side to the inverter 60 side at the off state, when the battery 15 is in the forward connection.

Inter-arm connection nodes Nu, Nv, and Nw are connected to three-phase windings 81, 82, and 83 of the motor 80, respectively. The inter-arm connection nodes Nu, Nv, Nw are connection nodes between corresponding two of the switching elements 61 to 66 in the upper arm and the lower arm of respective phases of the inverter 60. The inverter 60 converts DC power of the battery 15 and then supplies the converted power to the three-phase windings 81, 82, 83. For example, when the motor 80 is in a Y-connection, the three-phase windings 81, 82, 83 are connected at a neutral point Nm. However, the three-phase windings 81, 82, and 83 may also be in delta connection.

The motor relays 71, 72, 73 are provided in a motor current path between the inter-arm connection points Nu, Nv, Nw of corresponding phases and the phase windings 81, 82, 83, respectively. The motor relays 71, 72, 73 are MOSFETs, and have parasitic diodes that allow current to flow from the inter-arm connection points Nu, Nv, Nw to the phase windings 81, 82, 83, respectively. The motor relays 71, 72, 73 interrupt the current from the motor 80 side to the inverter 60 side when the motor relays 71, 72 73 are in the off state. Although not shown, a current sensor for detecting phase current is provided at the inverter 60 or each phase motor current path.

The internal power generation circuit 18 generates an internal power supply voltage based on the 24V/48V PIG voltage applied from the power line Lp after the choke coil 17, and outputs the generated voltage to the control circuit 30 and the three-phase pre-driver circuit 40. The internal power generation circuit 18 according to the present embodiment functions as a step-down regulator that reduces the 24V/48V PIG voltage to 12V. When the motor driver 101 is started, a wake-up signal is sent from the IG line Lig to the internal power generation circuit 18 and the control circuit 30.

The control circuit including the microcomputer and the integrated IC is operated by a voltage applied from the battery 15 to control the operation of the inverter 60. During the normal operation of the motor driver 101, the control circuit 30 calculates a drive signal for the inverter 60 by current feedback control based on the phase current detection value and the motor rotation angle so that the motor 80 outputs the command torque. Further, as shown by broken lines, the control circuit 30 outputs ON/OFF signals to, for example, the motor relays 71, 72, 73. In the case of a dual-system configuration, control information may be mutually communicated between the respective microcomputers of individual systems.

In this embodiment, the "multiphase load" to be driven is the three-phase motor 80, and the three-phase pre-driver circuit 40 is provided as the "multiphase pre-driver circuit." The three-phase pre-driver circuit 40 drives the switching elements 61 to 66 of the inverter 60 based on the drive signal calculated by the control circuit 30. The detailed configuration of the three-phase pre-driver circuit 40 will be explained in the fifth embodiment.

The above description of the configuration of FIG. 1 is common to the first to fourth embodiments. In contrast to the second to fourth embodiments, in the first embodiment, the output voltage of the internal power generation circuit 18 is applied to the gate of the reverse connection protective relay 52 via the gate voltage application path 53. That is, a voltage of 12 volts generated by the internal power generation circuit 18 based on the voltage applied from the battery 15 to the power supply line Lp is applied to the gate of the reverse connection protective relay 52.

In a situation where the battery 15 is in the reverse connection, the internal power supply generation circuit 18 cannot generate a voltage. Therefore, the gate voltage cannot be applied. In other words, the voltage for turning on the reverse connection protective relay 52 is applied to a gate of the reverse connection protective relay when the battery is connected in a forward direction, but is not applied to the gate when the battery 15 is in the reverse connection. In the GB arrangement, the reverse connection protective relay 52 is located between the filter capacitor 16 and the battery 15, a negative bias voltage is not applied to the filter capacitor 16 when the reverse connection protective relay 52 is in the off state.

Figure 2:
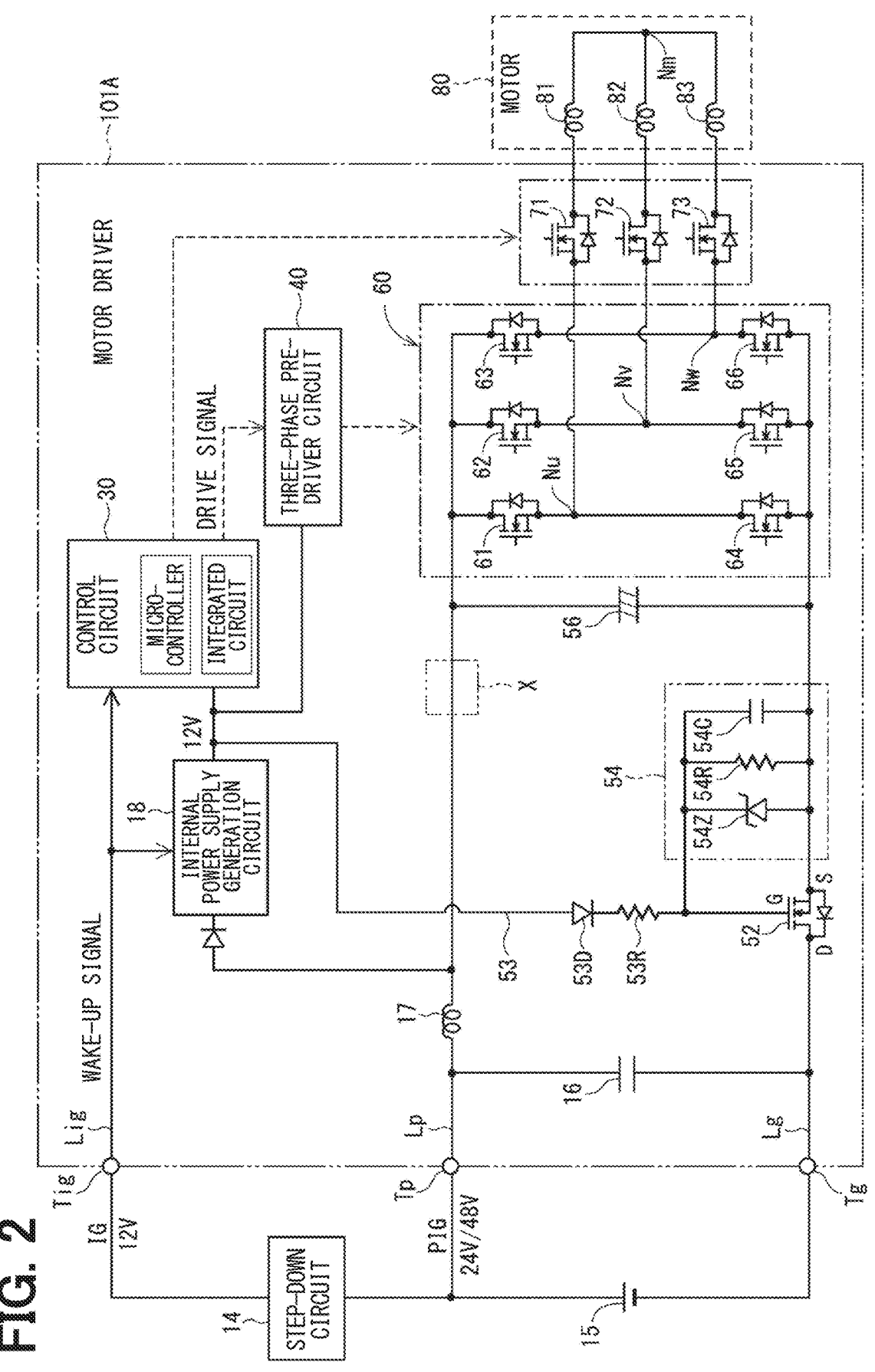
FIG. 2 is a configuration diagram of a motor driver in GA arrangement according to a first embodiment.

FIG. 2 illustrates the motor driver 101A according to the first embodiment in the GA arrangement. The reverse connection protective relay 52, the gate voltage application path 53 and the OFF-delay circuit 54 are provided between the LC filter circuit and the inverter 60. The gate voltage application path 53 has elements 53D, 53R following the reverse connection protective relay 52. In the GA arrangement, a negative bias voltage is applied to the filter capacitor 16 even if the reverse connection protective relay 52 is turned off when the battery 15 is in the reverse connection. For example, when a non-polar capacitor such as a film capacitor is used in the LC filter circuit, the GA arrangement may be adopted.

The advantageous effects (1) to (3) in the first embodiment will be explained. The advantageous effect (2) is particularly exhibited in the GB arrangement when the polar filter capacitor is used. Other advantageous effects are common to the GB arrangement and the GA arrangement.

Figure 10:
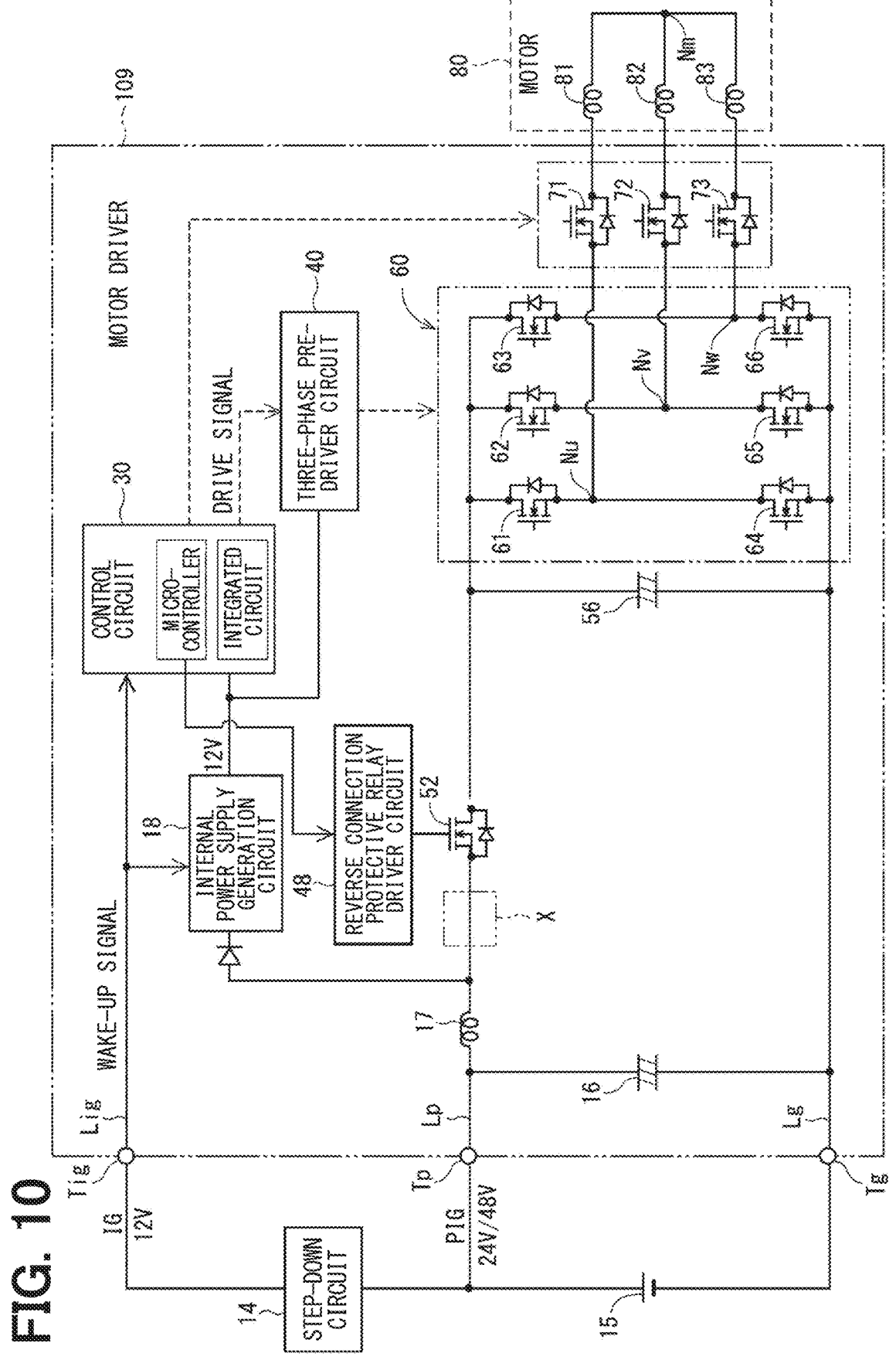
FIG. 10 is a configuration diagram of a motor driver according to a comparative example.

(1) Simplification of Reverse Connection Protective Relay Drive Configuration by Gate Drive at Low Voltage In the motor driver 109 according to the comparative example shown in FIG. 10, a reverse connection protective relay 52 being an N-channel MOSFET is provided on the power supply line Lp. The motor driver 109 includes a reverse connection protective relay driver circuit 48 for turning on the reverse connection protective relay 52. The driver circuit 48 is a high-voltage driver that can apply a voltage obtained by adding the gate drive voltage to the battery voltage, and is difficult to be reduced in size.

In contrast, in the motor drive device 101 of the first embodiment, since the reverse connection protection relay 52 is provided on the ground line Lg, gate drive at a low voltage is possible, and a high voltage drive driver is not required. Therefore, the reverse connection protection relay 52 can be driven with a simple configuration.

(2) Protection of Polar Capacitor or the like Against Negative Bias Voltage

When the battery 15 is in the reverse connection, in the motor driver 101 according to the first embodiment, a voltage required for turning on the reverse connection protective relay 52 is not applied to the gate of the reverse connection protective relay 52 from the internal power supply generation circuit 18. Thus, the reverse connection protective relay 52 is turned to the off state. Therefore, by adopting the GB arrangement, the polar filter capacitor 16 and the like used in the LC filter circuit can be protected against the negative bias voltage. This eliminates the need to use a large non-polar capacitor to avoid breakdown caused by the negative bias voltage, so that the miniaturization is easily facilitated.

Figure 3:
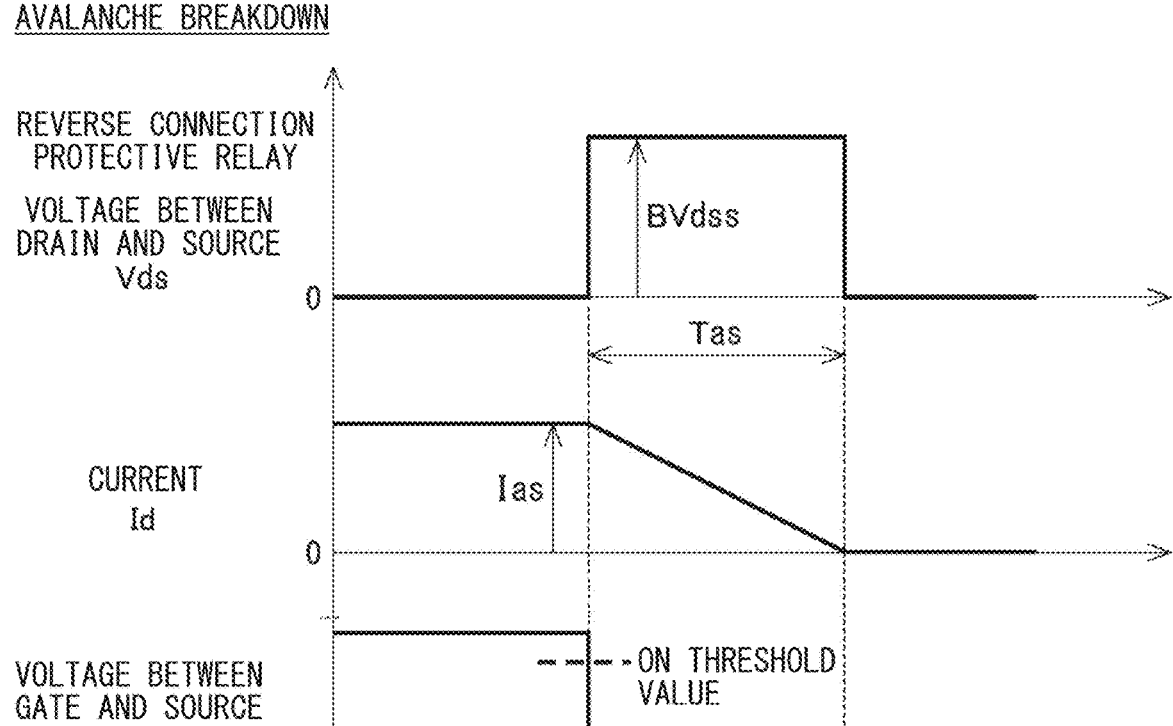
FIG. 3 is a time chart illustrating avalanche breakdown of a reverse connection protective relay due to a negative surge voltage.

(3) Protection of Reverse Connection Protective Relay Against Negative Surge Voltage With reference to FIG. 3, avalanche breakdown of the reverse connection protective relay 52 when a negative surge voltage is applied will be described. The vertical axis of FIG. 3 shows, from the top in order, the voltage Vds, current Id, and voltage Vgs of the reverse connection protective relay 52. The voltage Vds is a voltage between the drain and source of the reverse connection protective relay 52. The voltage Vgs is a voltage between the gate and source of the reverse connection protective relay 52. In the initial state before the timing ts, the reverse connection protective relay 52 is in the on state, a value of the voltage Vds is zero, and a voltage of the voltage Vgs is equal to or larger than an ON threshold value. A large current corresponding to an ON current flows through the current Id.

When a negative surge is applied to the battery voltage at timing ts while the reverse connection protective relay 52 is in the on state, the energy charged in the inverter capacitor 56 is regenerated into the battery 15. At this time, when the voltage Vgs decreases and the reverse connection protective relay 52 is turned off, the voltage Vds increases and reaches the breakdown voltage BVdss of the MOSFET. In this state, the state in which the current Id flows while gradually decreasing from the avalanche current las to zero continues over the avalanche time Tas until the timing te.

Avalanche energy Eas generated during avalanche time Tas is expressed by the following equation. This avalanche energy Eas causes the reverse connection protective relay 52 to be in the breakdown state by avalanche.

$$Eas = (1/2) \times BVdss \times Ias \times Tas$$

The following describes the operation of the OFF-delay circuit 54 according to the first embodiment with reference to FIG. 4. A solid line indicates the first embodiment in which the OFF-delay circuit 54 is provided. The broken line indicates a hypothetical comparative example in which an OFF-delay circuit is not provided but recovery is possible without causing avalanche breakdown. Before the timing t1, the value of the GS voltage Vgs is an initial value Vgs0, which is equal to or higher than the ON threshold value, and the reverse connection protective relay 52 is turned on. In the present disclosure, the GS voltage Vgs refers to a voltage between a gate and a source of the reverse connection protective relay 52.

The first embodiment and the comparative example differ in the rate at which the GS voltage Vgs decreases after the negative surge voltage is applied at the timing t1. In the comparative example, the rate of decrease in the voltage Vgs is fast, and the voltage Vgs falls below the ON threshold value and the reverse connection protective relay 52 is turned off at the timing t2. Subsequently, when the negative surge voltage is eliminated, the voltage Vgs starts recovery toward the initial value Vgs0 at the timing t3. When the value of the voltage Vgs reaches the ON threshold value at the timing t4, the reverse connection protective relay 52 is again turned on.

On the other hand, in the first embodiment, the rate of decrease in the voltage Vgs is slow, and the voltage Vgs does not decrease to the ON threshold value between the timing t1 and the timing t3, and then is shifted to the recovery state at the timing t3. Therefore, the reverse connection protective relay 52 is maintained in the on state. Since it is possible to avoid a situation in which the voltage Vds rises and reaches the breakdown voltage BVdss at the time of applying the negative surge voltage, the avalanche breakdown of the reverse connection protective relay 52 can be prevented.

Figure 5:
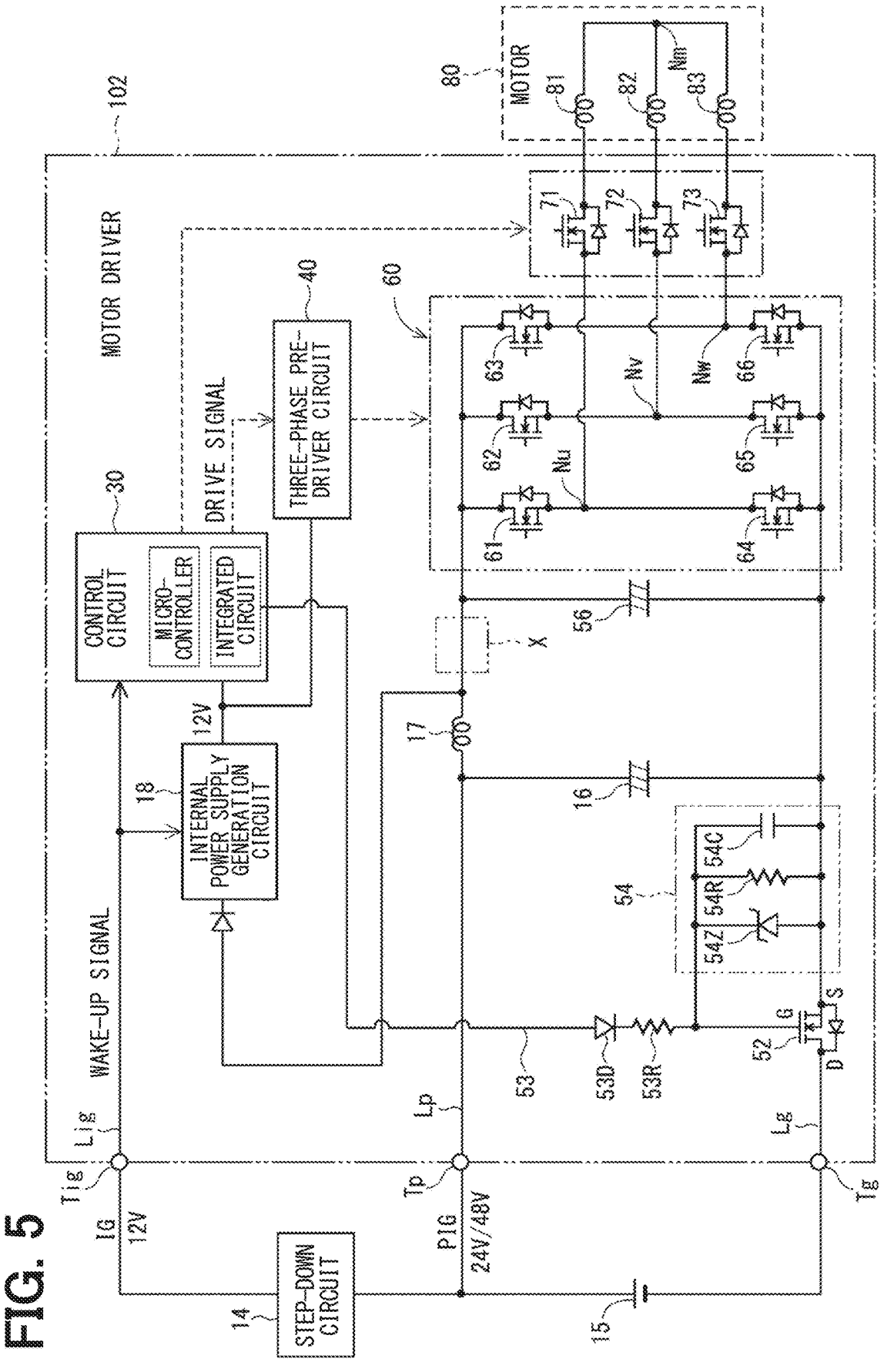
FIG. 5 is a configuration diagram of a motor driver in GB arrangement according to a second embodiment.
Figure 6:
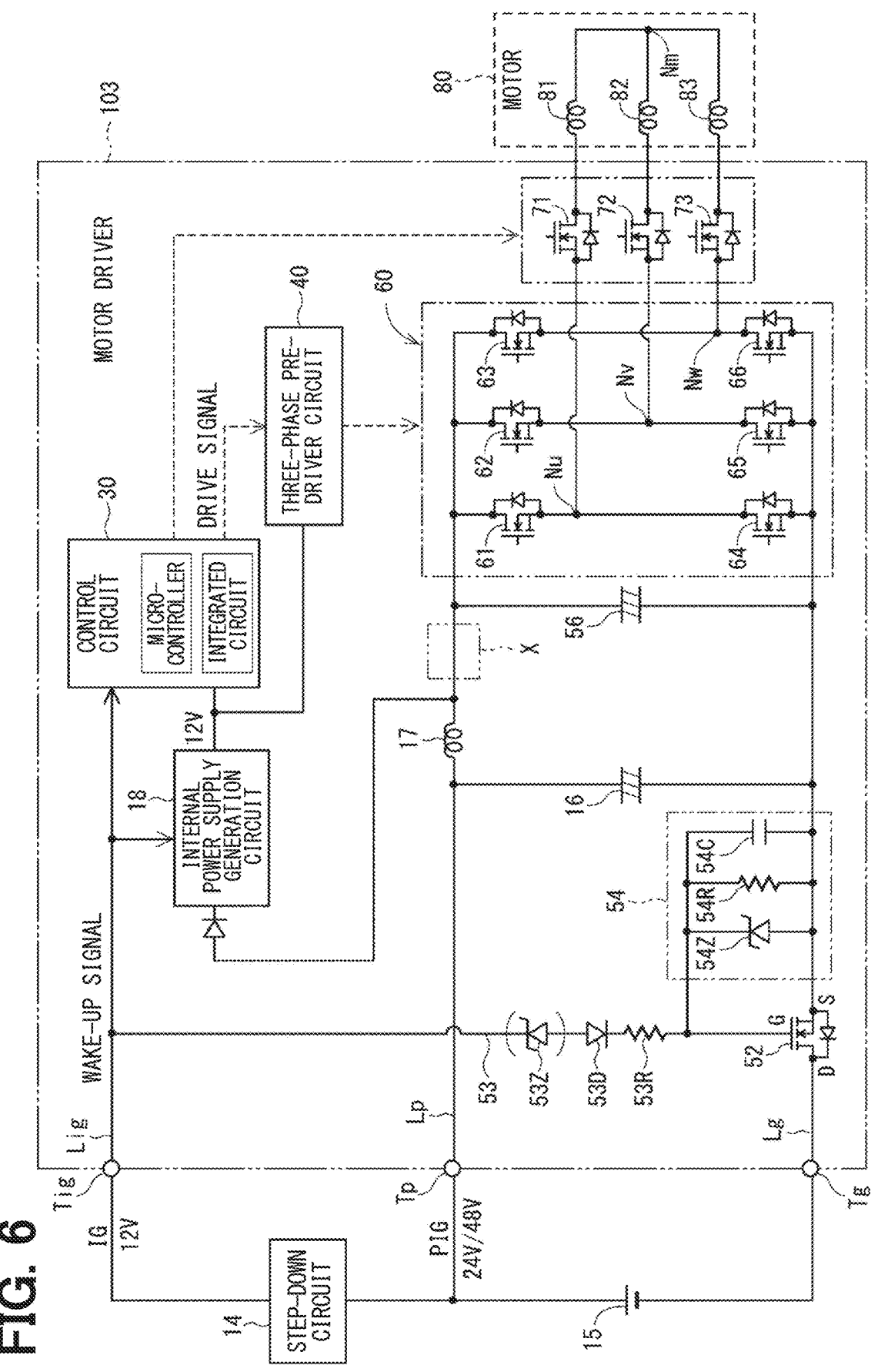
FIG. 6 is a configuration diagram of a motor driver in GB arrangement according to a third embodiment.
Figure 7:
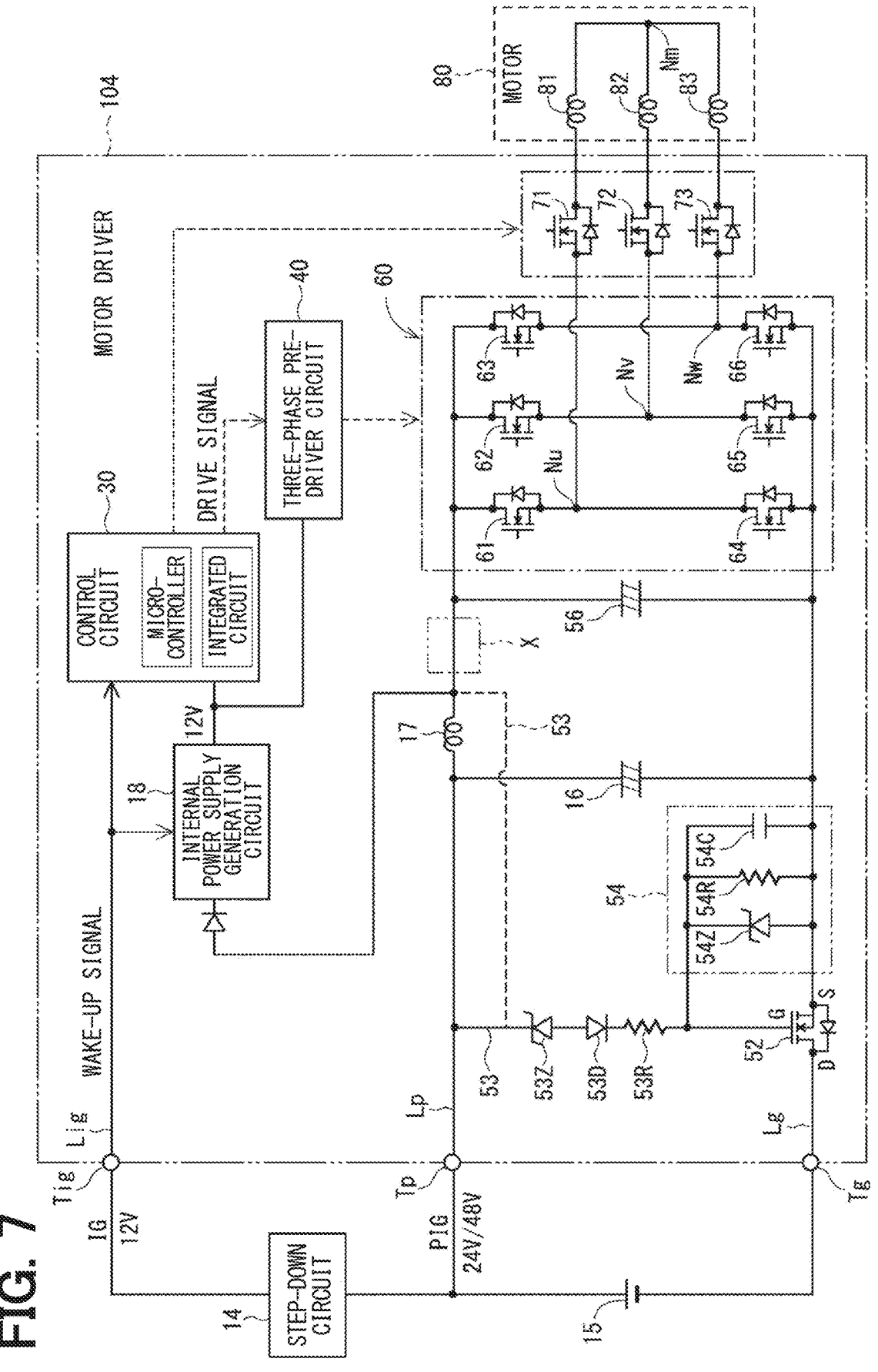
FIG. 7 is a configuration diagram of a motor driver in GB arrangement according to a fourth embodiment.

The following describes the motor drivers according to the second to fourth embodiments with reference to FIGS. 5 to 7. The second to fourth embodiments are different from the first embodiment such that the voltage application path to the gate of the reverse connection protective relay 52 provided on the ground line Lg is different. FIGS. 5 to 7 illustrate the GB arrangement according to the respective embodiments. The GA arrangement of each embodiment can be inferred based on FIG. 2, and therefore illustration thereof is omitted. The second to fourth embodiments similarly attain the advantageous effects (1) to (3) described in the first embodiment.

Second Embodiment

In a motor driver 102 according to the second embodiment illustrated in FIG. 5, the reverse connection protective relay 52 is driven by a gate signal transmitted from the control circuit 30. For example, a voltage of about 5 volts generated by an integrated IC in the control circuit 30 is applied to the gate of the reverse connection protective relay 52. When the battery 15 is in the reverse connection, the control circuit 30 does not operate and no gate signal is applied. Thus, the reverse connection protective relay 52 is not turned on.

Third Embodiment

In a motor driver 103 according to the third embodiment illustrated in FIG. 6, an IG voltage applied to the IG line as a wake-up signal is applied to the gate of the reverse connection protective relay 52. Since no IG voltage is applied when the battery 15 is in the reverse connection, the reverse connection protective relay 52 is not turned on.

In a system in which the step-down circuit 14 does not stop while the motor driver 103 is stopped, a Zener diode 53Z may be located in the gate voltage application path 53 from the IG line Lig to the reverse connection protective relay 52 as shown in the parentheses in FIG. 6. Similarly to the fourth embodiment, a dark current can be interrupted by providing a Zener diode 53Z in the gate voltage application path 53.

Fourth Embodiment

In a motor driver 104 according to the fourth embodiment illustrated in FIG. 7, the PIG voltage applied from the battery 15 to the power supply line Lp is applied to the gate of the reverse connection protective relay 52. As illustrated in FIG. 7, the PIG voltage may be applied from the power line Lp before the choke coil 17 as shown by the solid line, or may be applied from the power line Lp after the choke coil 17 as shown by the broken line. Since no PIG voltage is applied when the battery 15 is in the reverse connection, the reverse connection protective relay 52 is not turned on.

A Zener diode 53Z is located in a gate voltage application path 53 from the power supply line Lp to the reverse connection protection relay 52, and is connected to the diode 53D and the resistor 53R in series. Since the PIG voltage is normally applied to the power supply line Lp even when the motor driver 104 is stopped, the dark current can be interrupted by providing the Zener diode 53Z in the gate voltage application path 53.

Fifth Embodiment

Figure 8:
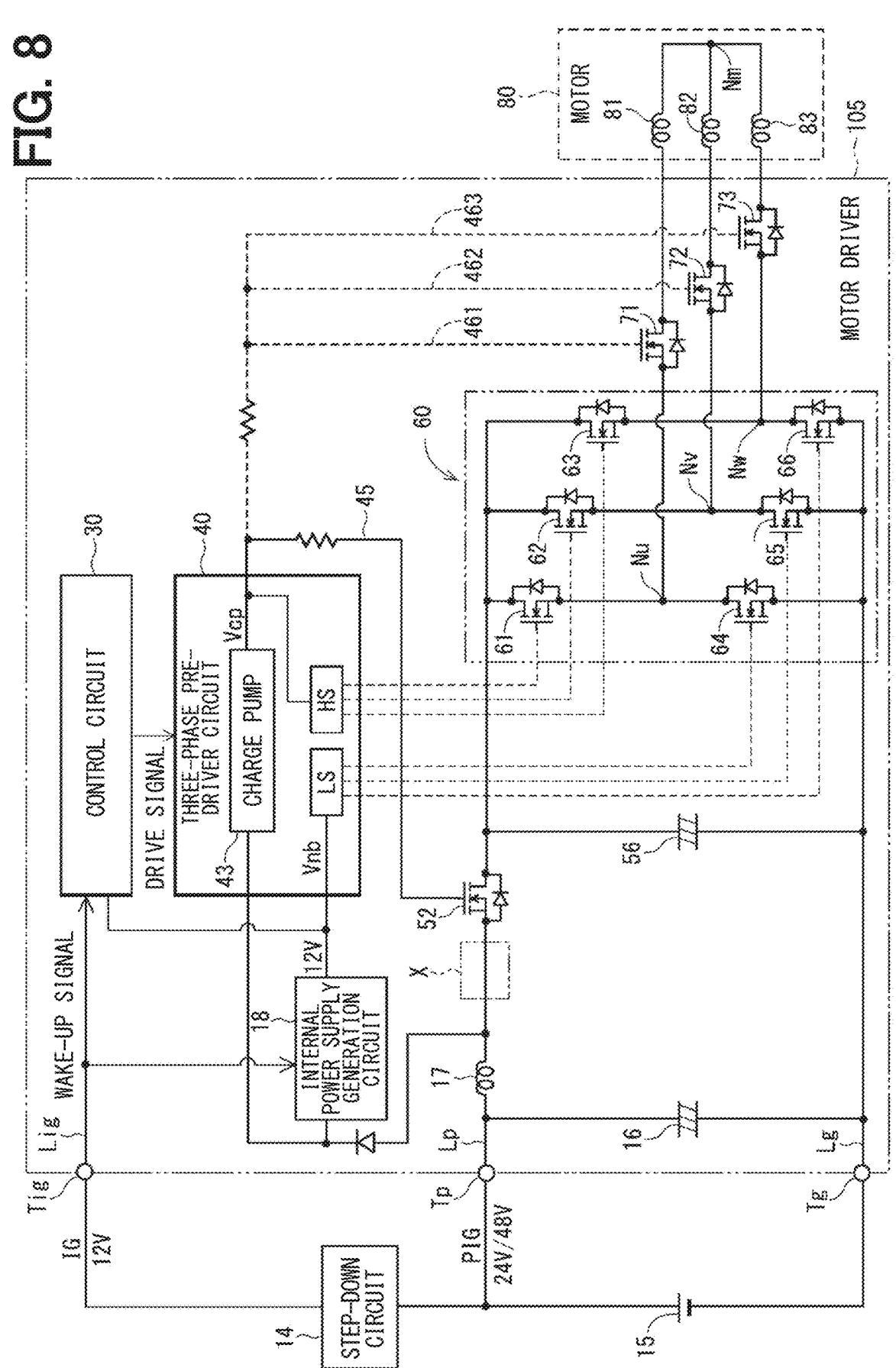
FIG. 8 is a configuration diagram of a motor driver according to a fifth embodiment.
Figure 9:
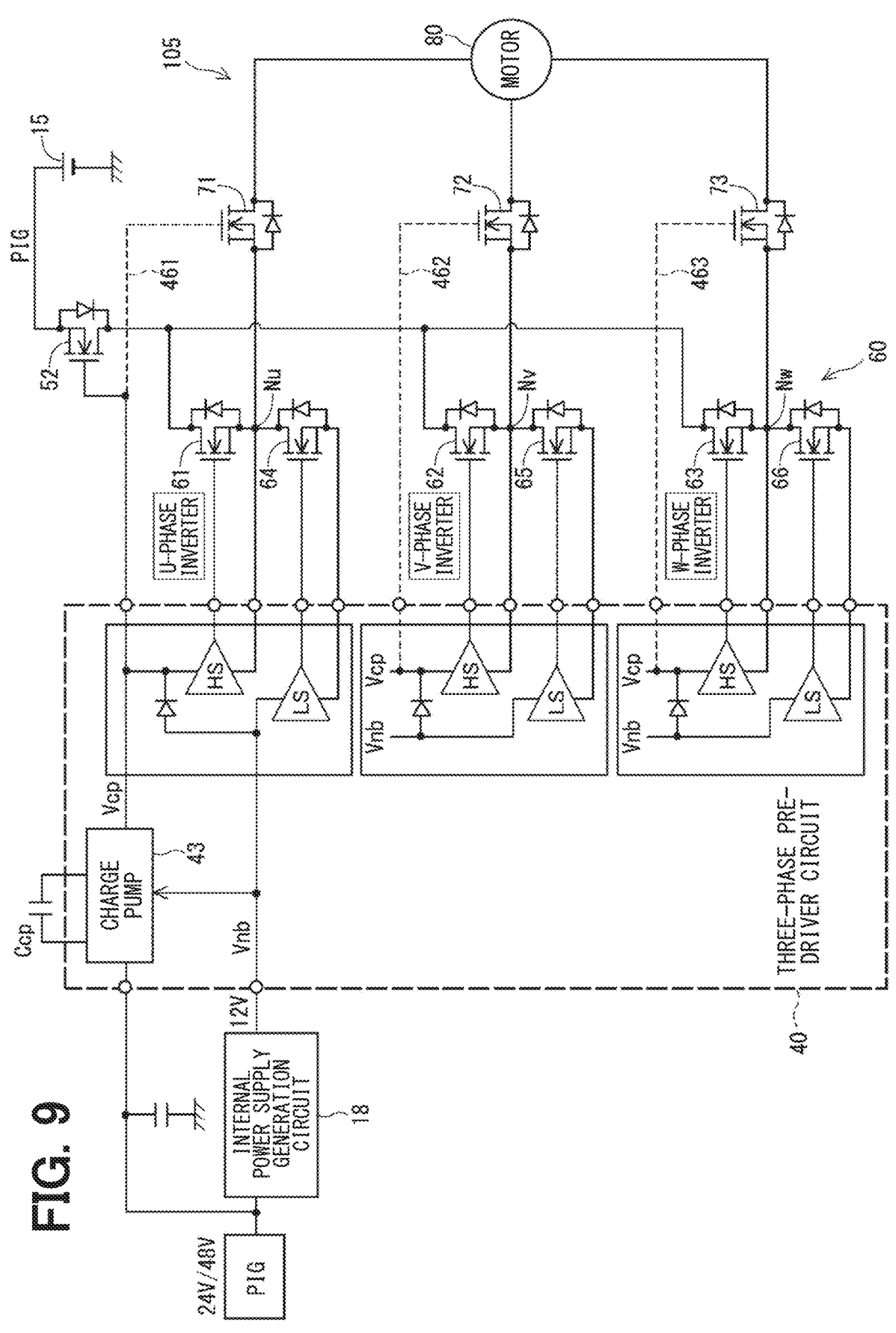
FIG. 9 is a circuit diagram showing a motor relay drive configuration in a motor driver according to a fifth embodiment.

The following describes a motor driver 105 according to the fifth embodiment with reference to FIGS. 8 and 9. Unlike the first to fourth embodiments, in the fifth embodiment, the reverse connection protective relay 52 may be provided on either the power supply line Lp or the ground line Lg. In particular, the fifth embodiment is characterized in that the reverse connection protective relay 52 can be installed on the power supply line Lp that requires a high gate drive voltage. Therefore, each of FIGS. 8 and 9 illustrates a configuration in which the reverse connection protective relay 52 is provided on the power supply line Lp. The configuration in which the reverse connection protective relay 52 is provided on the ground line Lg is omitted from illustration.

In the fifth embodiment, the reverse connection protective relay 52 is driven by a charge pump voltage of the three-phase pre-driver circuit 40. A shown by broken lines in FIGS. 8 and 9, the motor relays 71, 72, and 73 may be driven by the charge pump voltage together with the reverse connection protective relay 52. FIG. 9 particularly illustrates the configuration of the three-phase pre-driver circuit 40 and the drive configuration of the reverse connection protective relay 52. The three-phase pre-driver circuit 40 operates with the voltage applied from the battery 15, and drives the switching elements 61 to 66 of the inverter 60.

The three-phase pre-driver circuit 40 is applied with the PIG voltage of 24V/48V from the power supply line Lp located after the choke coil 17. A voltage of 12V generated by the internal power supply generation circuit 18 based on the PIG voltage is applied to the three-phase pre-driver circuit 40. When the battery 15 is in the reverse connection, the reverse connection protective relay 52 is not turned on because the three-phase pre-driver circuit 40 is not in operation. Therefore, in the configuration in which the reverse connection protective relay 52 is provided on the ground line Lg, the same advantageous effect as the advantageous effect (2) described in the first embodiment can be obtained by using the GB arrangement.

The three-phase pre-driver circuit 40 includes a charge pump 43 that boosts the battery voltage. The output voltage of the charge pump 43 is referred to as a charge pump voltage Vcp. Furthermore, the voltage of 12V provided via the internal power supply generation circuit 18 is referred to as a non-boosted voltage Vnb. The charge pump voltage Vcp is output to the gates of upper arm (high side) switching elements 61 to 63. The non-boosted voltage Vnb is output to the gates of the lower arm (low side) switching elements 64 to 66. In the drawing, "HS" indicates the high side, and "LS" indicates the low side.

While the power supply voltage is being applied to the three-phase pre-driver circuit 40, the charge pump 43 superimposes the voltage charged in the capacitor Ccp and basically continues to output a constant voltage at all times. When the supply of power supply voltage to the three-phase pre-driver circuit 40 is interrupted, or when the charge pump voltage Vcp exceeds the upper limit threshold or falls below the lower limit threshold, the logic circuit in the three-phase pre-driver circuit 40 stops the operation of the charge pump 43.

In the fifth embodiment, the output end of the charge pump 43 is connected to the gate of the reverse-connection protective relay 52 via a charge pump voltage path 45. As a result, the reverse connection protection relay 52 is turned on by the output voltage Vcp of the charge pump 43 during the operation of the charge pump 43. In other words, without adopting a driver circuit dedicated to the reverse connection protective relay, it is possible to turn on the reverse connection protective relay 52 by adopting the charge pump voltage Vcp required for driving the upper arm switching elements 61 to 63 of the inverter 60.

The motor driver 105 according to the fifth embodiment does not require a driver circuit dedicated to the reverse connection protection relay. Therefore, the reverse connection protective relay can be driven with a simple configuration. For example, when the battery voltage is increased from 12V to 24V/48V, the charge pump voltage Vcp for driving the inverter 60 is increased, and the reverse connection protective relay 52 can also be driven.

As shown by the broken line, the output end of the charge pump 43 may be connected to the gates of the motor relays 71, 72, 73 corresponding to respective phases via the charge pump voltage paths 461, 462, 463. In this configuration, the motor relays 71, 72, 73 corresponding to the respective phases are turned on by the output voltage Vcp of the charge pump 43 during the operation of the charge pump 43. By making the reverse connection protective relay 52 and the motor relays 71, 72, and 73 have a common drive structure, the structure of the device can be made smaller and more highly integrated.

Other Embodiments

The load of the load driver in each of the first to fourth embodiments is not only limited to a three-phase motor 80, but may also be a single-phase motor or a multiphase motor other than the three-phase motor. Additionally, the load may also be an actuator other than a motor or another load. For example, an H-bridge circuit may be used instead of an inverter as a power converter. The "multiphase load" of the load driver in the fifth embodiment is not limited to the three-phase motor 80, but may also be a multiphase motor other than the three-phase motor or a multiphase load. Accordingly, the number of phases in the multiphase predriver circuit may not be limited to three, but may also be two or four or more.

The semiconductor switching element included in, for example, the reverse connection protective relay 52 is not limited to a MOSFET, but may also be another semiconductor switching element such as a bipolar transistor.

The structure of the OFF-delay circuit may not be limited to the one in which the Zener diode and the RC elements are connected in parallel. Any kind of circuit may be used as long as the time until the reverse connection protective relay 52 being turned off is delayed when the voltage applied to the gate decreases.

The load driver according to the present disclosure may be applied to various devices for driving a load including in-vehicle devices other than electric power steering devices and devices other than devices to be mounted on vehicles.

The present disclosure should not be limited to the embodiment described above. Various other embodiments may be implemented without departing from the scope of the present disclosure.

The control circuit and the technique according to the present disclosure may be achieved by a dedicated computer provided by constituting a processor and a memory programmed to execute one or more functions embodied by a computer program. Alternatively, the control circuit and the method described in the present disclosure may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer program may be stored in a computer-readable non-transitory tangible recording medium as an instruction to be executed by a computer.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A load driver comprising:
   a power converter connected between a power supply line and a ground line, the power supply line connected to a battery, the power converter configured to supply converted power to a load by converting direct current power of the battery;
   a control circuit configured to control the power converter by a voltage applied from the battery;
   a reverse-connection protective relay being a semiconductor switching element and connected to the ground line, the reverse-connection protective relay configured to be turned off to interrupt a current flowing from the ground line to the power supply line via the power converter in a case where the battery is connected in a reverse direction; and
   an OFF-delay circuit configured to delay timing of turning off the reverse-connection protective relay, in response to a decrease in a voltage applied to a gate of the reverse-connection protective relay,
   wherein a voltage required for turning on the reverse-connection protective relay is applied to the gate of the reverse-connection protective relay in a case where the battery is connected in a forward direction, and is not applied to the gate of the reverse-connection protective relay in a case where the battery is connected in the reverse direction.

2. The load driver according to claim 1, further comprising:

an LC filter circuit including an inductor and a filter capacitor, the filter capacitor having polarity and connected between the power supply line and the ground line, wherein the reverse-connection protective relay is connected to the ground line between the battery and a negative electrode of the filter capacitor.

3. A load driver comprising:

a power converter connected between a power supply line and a ground line, the power supply line connected to a battery, the power converter configured to supply converted power to a load by converting direct current power of the battery;

a control circuit configured to control the power converter by a voltage applied from the battery;

a reverse-connection protective relay being a semiconductor switching element and connected to the ground line, the reverse-connection protective relay configured to be turned off to interrupt a current flowing from the ground line to the power supply line via the power converter in a case where the battery is connected in a reverse direction; and an internal power supply generation circuit configured to apply a generated voltage to a gate of the reverse-connection protective relay based on a voltage applied from the battery to the power supply line, wherein a voltage required for turning on the reverse-connection protective relay is applied to the gate of the reverse-connection protective relay in a case where the battery is connected in a forward direction, and is not applied to the gate of the reverse-connection protective relay in a case where the battery is connected in the reverse direction.

4. The load driver according to claim 3, further comprising:

an OFF-delay circuit configured to delay timing of turning off the reverse-connection protective relay, in response to a decrease in a voltage applied to the gate of the reverse-connection protective relay.

5. A load driver comprising:

a power converter connected between a power supply line and a ground line, the power supply line connected to a battery, the power converter configured to supply converted power to a load by converting direct current power of the battery;

a control circuit configured to control the power converter by a voltage applied from the battery;

a reverse-connection protective relay being a semiconductor switching element and connected to the ground line, the reverse-connection protective relay configured to be turned off to interrupt a current flowing from the ground line to the power supply line via the power converter in a case where the battery is connected in a reverse direction; and a Zener diode connected to a gate voltage application path of the reverse-connection protective relay, the Zener diode configured to interrupt a dark current, wherein a voltage required for turning on the reverse-connection protective relay is applied to the gate of the reverse-connection protective relay in a case where the battery is connected in a forward direction, and is not applied to the gate of the reverse-connection protective relay in a case where the battery is connected in the reverse direction.

6. A load driver comprising:

a power converter including pairs of an upper arm switching element and a lower arm switching element, the upper arm switching element and the lower arm switching element being connected in series between a power supply line and a ground line, the pairs of the upper arm switching element and the lower arm switching element corresponding to respective phases of a load, the power supply line connected to a battery, the power converter configured to supply converted power to the load by converting direct current power of the battery;

a control circuit configured to control the power converter by a voltage applied from the battery;

a reverse-connection protective relay being a semiconductor switching element, the reverse-connection protective relay configured to be turned off to interrupt a current flowing from the ground line to the power supply line via the power converter in a case where the battery is connected in a reverse direction; and a multiphase pre-driver configured to control the pairs of the upper arm switching element and the lower arm switching element in the power converter by a voltage applied from the battery, the multiphase pre-driver having a charge pump configured to boost the voltage applied from the battery, the charge pump having an output end connected to a gate of the reverse-connection protective relay, wherein the reverse connection protective relay is further configured to be turned on by an output voltage of the charge pump during an operation of the charge pump.

* * * * *